July 31, 1934.  W. L. SHIVELY  1,968,320
SELF CLEANSING VALVE MECHANISM
Filed Jan. 31, 1931  2 Sheets-Sheet 1
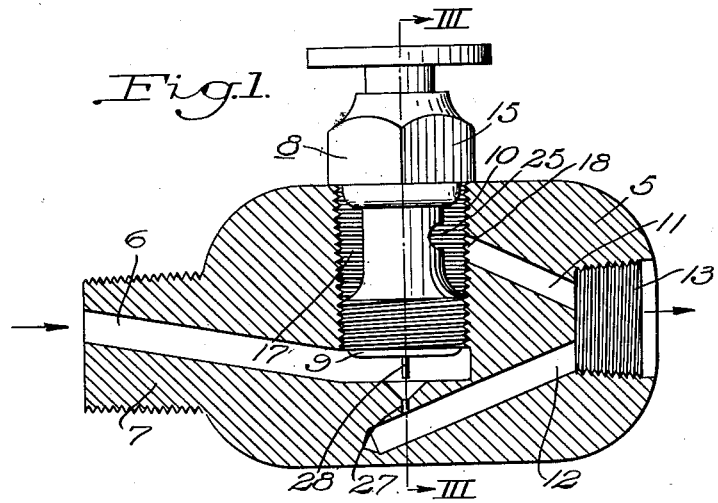
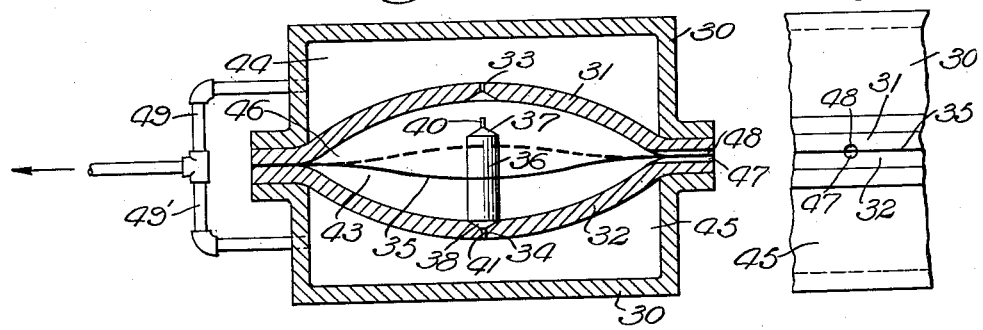
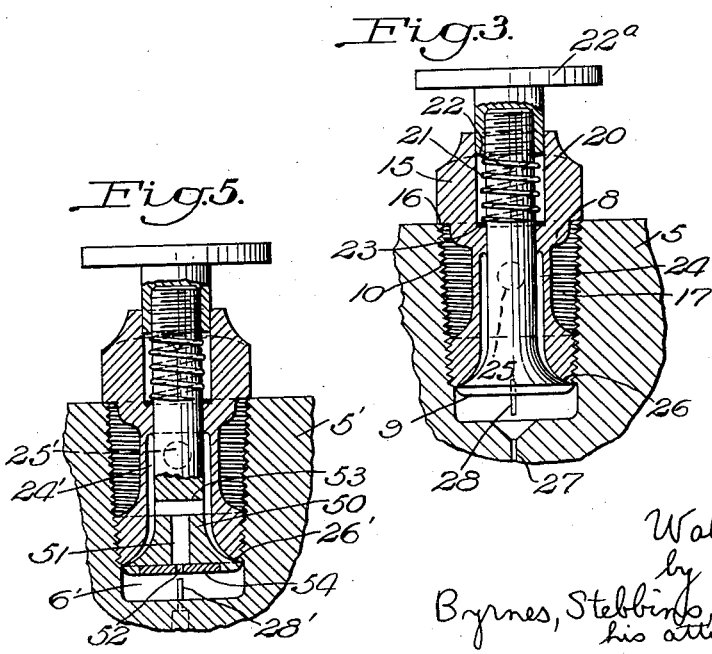
INVENTOR
Walter L. Shively
by
Byrnes, Stebbins, Parmelee & Blenko
his attorneys July 31, 1934.  W. L. SHIVELY  1,968,320
SELF CLEANSING VALVE MECHANISM
Filed Jan. 31, 1931  2 Sheets-Sheet 2
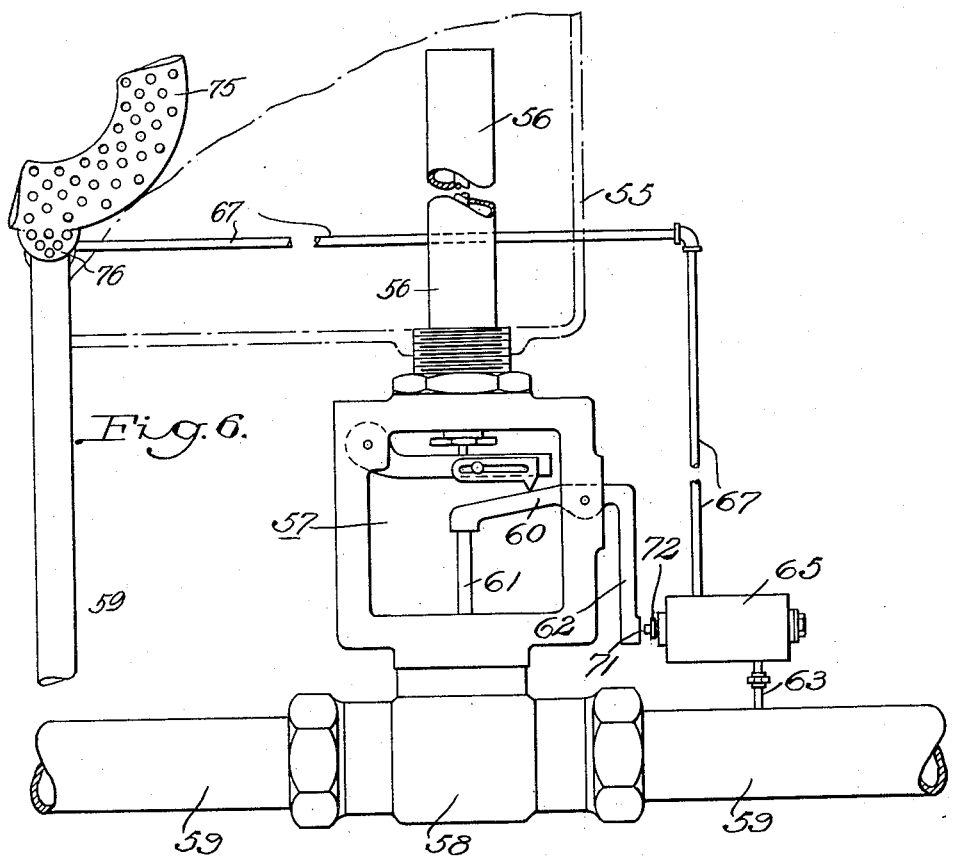
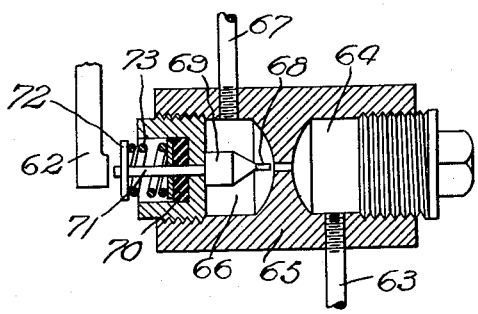
INVENTOR
Walter L. Shively
by Byrnes, Stebbins, Parmelee & Blenko
his Attorneys

Patented July 31, 1934

1,968,320

UNITED STATES PATENT OFFICE 1,968,320

SELF-CLEANSING VALVE MECHANISM

Walter L. Shively, East Orange, N. J., assignor to The Koppers Company of Delaware, Pittsburgh, Pa., a corporation of Delaware Application January 31, 1931, Serial No. 512,723

11 Claims. (Cl. 158—120)

This invention relates to a valve of the self-cleaning type. Such valves are useful where the fluid flowing through the valve mechanism tends to clog the ports or passages in the valve mechanism. This difficulty has been encountered in a variety of different control mechanisms; and as an example of such clogging may be taken the trouble experienced in connection with pilot lights used as an attachment for gas ranges for lighting the burners. It has been discovered that pilot outages are caused by minute deposits from the gas flowing through the valve mechanism which deposits occur on and around the small orifice through which the gas passes to the pilot light.

One object of this invention is to provide improved valve mechanism of the self-cleaning type which is arranged to be self-cleaning through the movement into and out of the opening which is liable to become clogged of a projection such as a pin or the like, upon relative movement between a valve element and the port or passage controlled thereby. A more specific object of my invention is to provide an improved valve mechanism of the type in which a small pilot flame is kept burning and which includes a valve element which may be moved to open position to permit a greatly increased flow of gas, movement of this valve element causing a projecting portion to enter and clean the opening or port through which the gas supply for the small pilot flame flows.

In the accompanying drawings in which, not as limiting my invention, but merely for the purpose of illustrating the same, I have shown two embodiments of my invention, Figure 1 is a sectional view through a valve mechanism of the Rutz lighter type embodying my invention;

Figure 2 is a central sectional view through a valve mechanism which is thermostatically controlled;

Figure 3 is a vertical sectional view through the mechanism shown in Figure 1 and taken on the line III—III;

Figure 4 is a detail view in side elevation of the mechanism shown in Figure 2;

Figure 5 is a view similar to Figure 3 showing a modified valve construction in which the cleaning pin is stationary;

Figure 6 is a view of a thermostatically controlled valve having combined therewith and actuated thereby a self-cleaning pilot light orifice;

Figure 7 is a sectional detail view of the pilot light orifice of Figure 6.

The valve mechanism disclosed in Figures 1 and 3 is especially adapted to control flow of gas to a lighter of the type which maintains a small pilot flame at all times and increases the flame to such an extent when the valve mechanism is opened wide that the flame ignites the combustible mixture issuing from a burner. Such a lighter may be of the well known Rutz type. Ordinarily, in the Rutz form of lighter, there is a restricted orifice through which the flow of gas for maintaining the pilot light passes. There is a tendency for minute deposits of solid material in and around this restricted orifice resulting in decreasing the flow of gas to the pilot flame to such an extent that the flame is extinguished.

In the improved form of valve mechanism shown in Figures 1 and 3, there is provided in the casing 5 a plurality of passages for the flow of gas through the casing. The gas enters by way of a passageway 6 which extends first through the threaded connection 7 and then through the body of the casing 5. A bore is provided in the body of the casing 5 to contain a valve cage 8 and a valve proper 9, this bore being threaded as shown at 10. A passage 11 and a passage 12 both communicate with a threaded bore 13 which forms a connection through which the gas may discharge to the lighter burner.

The valve cage 8 has a hexagonal head 15 terminating in a shoulder 16 which, when the cage is inserted in operative position, engages the casing 5 surrounding the bore 10. The portion of the valve cage which extends within the casing 5 beyond the shoulder 16 is of reduced diameter which forms a chamber 17 communicating through the port 18 with the passage 11. Below this groove, the cage 8 is threaded, these threads engaging the threads 10 so as to draw the shoulder 16 of the cage up tight.

The valve cage 8 is hollow to receive the stem of the valve proper 9. Within the hexagonal portion 15 is a counter-bore 20 which receives a coil spring 21 surrounding the stem of the valve proper 9. This spring engages the shoulder 22 of the head 22a. Below the counter-bore 20, the valve cage fits the stem of the valve proper 9 with a sliding fit, thus providing a shoulder 23 supporting packing against which the lower end of the spring 21 bears. The lower portion of the valve cage provides a bell-shaped opening having the greater portion of its walls spaced from the stem of the valve proper 9, as indicated at 24; and this chamber communicates with the chamber 17 through an opening 25. The lower portion of the valve proper 9 is flared outwardly so as to engage the annular seat 26 at the lower margin of the valve cage.

Between the passage 6 and the passage 12 is a restricted orifice or port 27 which is of suitable cross-section to permit the flow of sufficient gas through the same to the pilot light to maintain the flame. A projecting portion 28 of the valve proper 9 is arranged to enter the orifice or port 27 when the valve proper is depressed to open position. In the embodiment shown in Figures 1 and 3, the projecting portion 28 is made separately from the valve; and may be a pin pressed into a recess in the end of the valve proper.

In Figure 5 there is illustrated a modified form of valve mechanism; and in this figure the parts which are not changed from the form shown in Figures 1 and 3 are designated by the same numeral with a prime attached. The valve proper 50, however, has a longitudinal passage 51 which opens through a restricted port 52 into the space 6' beneath the valve proper. For convenience in manufacture, this restricted port 52 may be made in a disc 54 pressed into a recess in the end of the valve proper 50. A transverse passage 53 through the stem places the passage 51 in communication with the chamber 24'. A pin 28' is mounted in the bottom wall of the space 6' and alined with the port 52; so that the pin 28' interfits with or extends into and through the restricted port 52 when the valve proper and the bottom wall are in one relation, or specifically, when the valve proper opens and assumes a position closer to the bottom wall.

The operation of the form of valve mechanism shown in Figures 1 and 3 is as follows:—The gas flows in the direction of the arrow shown in Figure 1, and the restricted orifice or port 27 permits sufficient flow of gas from the passage 6 into the passage 12, and thence through the outlet to maintain the pilot flame. When it is desired to increase the extent of the flame, the valve proper is depressed by manually exerted pressure on the head 22a, thereby moving the flared lower portion thereof away from the seat 26. This permits the flow of a greatly increased volume of gas through the chamber 24 and opening 25, this gas finding its way through port 18 and passage 11 to the outlet. At the time that the valve proper 9 is depressed, the pin 28 moves into the restricted orifice or port 27 and cleans out any accumulation of material which may have accumulated and which tends to clog this orifice. It does not interfere with the operation of the pilot flame to have the orifice or port 27 substantially closed by the projecting portion 28 at the time that the valve proper 9 is depressed, because the amount of gas flowing through the passage 11 is many times as great as the volume which normally passes through the restricted orifice or port 27. Because the accumulation of deposit is cleaned out of the orifice or port 27 each time that the valve proper 9 is depressed to extend the flame of the lighter, the tendency of the restricted orifice 25 to become clogged is combated. Accordingly, the difficulty due to the pilot flame becoming extinguished is done away with by the normal use of the lighter.

The operation of the form of valve mechanism shown in Figure 5 is substantially the same as the operation of the form shown in Figures 1 and 3. The passage 12 is omitted; and gas is continually flowing from passage 6' by way of the valve mechanism to the passage 11 and the lighter burner. So long as the valve proper 50 is seated, the flow is restricted, since the only passageway is through the restricted port 52 and the passages 51 and 53 to the chamber 24'. If the valve proper 50 is depressed, the way is open for direct flow of gas from passage 6' into the chamber 24', this being a much augmented flow. The movement of the valve proper 50 relative to the pin 28' results in cleaning of the restricted port 52 in a manner which is obvious in view of the discussion of the form of valve mechanism shown in Figures 1 and 3.

In Figure 2 there is shown another embodiment in which there is incorporated the broad principles of my invention. It is frequently desirable to maintain a pilot flame in connection with a heater which operates intermittently to heat up water or the like. Trouble has been encountered due to the deposit of solid material in and around the restricted orifice through which the small amount of gas necessary to keep the pilot lighted passes. I have discovered that due to the alternate rise and fall in the temperature when the heater is alternately operating and not operating, cleaning of the restricted port is possible by the use of a bi-metallic disc of the well known type which is employed in thermostats. Such a disc may be arranged to project a cleaning pin or the like into the restricted port once out of every two times it reverses its position. In the preferred embodiment shown in Figure 2, a plurality of restricted ports are employed so that when the cleaning pin is in one of these ports, this is the only port which is obstructed.

Within the casing 30 is clamped a pair of dished valve casing members 31 and 32. Both of these casing members are perforated to provide restricted orifices for the flow of gas outwardly, the orifice or port 33 in the casing member 31 being opposed to the orifice or port 34 in the casing 32. Between the two casing members 31 and 32 is clamped a bi-metallic disc 35 of the well known type which is employed in thermostats and snaps from concave to convex and back again in accordance with changes in temperature. A valve member 36 is carried by the disc 35 in such position that its ends 37 and 38 may close the orifices or ports 33 and 34 alternately. It will be clear from the arrangement set forth that when the orifice or port 33 is open, the orifice or port 34 will be closed and vice-versa. A projecting portion 40 is arranged to enter the orifice or port 33 when the valve member 36 moves toward the same, and a projecting portion 41 is arranged to enter the orifice or port 34 when the valve member 36 moves in the opposite direction.

The valve casing members 31 and 32 enclose two chambers 43 and 46 separated by the disc 35. The casing 30 encloses two chambers, one of which is enclosed between the casing 30 and the casing member 31 and is designated by numeral 44, and the other of which is enclosed between the casing 30 and the casing member 32 and is designated by the numeral 45.

Fuel gas under substantially equal pressure is supplied to the two chambers 43 and 46 from a common source via the inlets 47 and 48. In the position of the disc shown in full lines in Figure 2, the restricted orifice 33 is unobstructed. If a change in temperature occurs, such as to cause reversal of the disc 35, the latter assumes the position indicated in dotted lines in Figure 2, and the orifice 34 is open and the orifice 33 is closed. The function of the disc 35 is not primarily a controlling function, as the orifices 33 and 34 are in parallel; but it will be noted that the changes in temperature which are assumed to occur cause automatic reciprocation of the member 36, thereby bringing about a cleaning of the two orifices 33 and 34 with each pair of reciprocations. The gas passes out through one or the other of the restricted ports into the chamber 44 or the chamber 45, and thence by the branch pipe 49 or 49' to the pipe leading to the pilot.

In Figure 6 there is shown still another embodiment of my invention; and in this embodiment the movement of parts already included in the normal design of heating apparatus is utilized to keep cleaned a pilot light orifice. A fluid chamber 55, such as a water heater tank, is shown in broken lines with a thermostat element 56 projecting into the same. Lever mechanism 57 functions under the control of the thermostat element 56 to open and close a main valve 58 in the supply line 59 leading to the water heater burner 75. The lever mechanism 57 includes a lever 60 having one portion bearing against the upper end of the stem 61 of the valve 58 and another portion 62 arranged to cooperate with cleaning means for the pilot light orifice. Gas from the main supply line 59 is conducted through a pipe 63 to a chamber 64 in the orifice member 65. The member 65 is provided with a second chamber 66 connected by a restricted orifice with the chamber 64. A pipe 67 leads from the chamber 66 to the pilot light 76 of the water heater burner 75. It is apparent, therefore, that whenever the orifice is free, gas flows from the main supply line through pipe 63 into chamber 64, through the restricted orifice into chamber 66, and thence by way of pipe 67 to the pilot light 76.

A pin 68 on the inner end of a reciprocable member 69 is alined with the orifice and is movable into and out of the same. Packing 70 surrounds the stem 71 of reciprocable member 69, so as to prevent leakage of gas from the chamber 66. Between this packing and an abutment 72 on the outer end of the stem 71 is arranged a coil spring 73 which tends to withdraw the pin 68 from the orifice. The operation of this embodiment of my invention is entirely automatic. When temperature changes in the chamber 55 cause the lever mechanism 57 to function to change the position of the valve 58, the portion 62 moves against the reciprocable member 69 to reciprocate the latter. When the valve stem 61 is moved downwardly, the valve 58 is opened and the pin 68 is pushed into the pilot light orifice. There is a slight amount of clearance between the portion 62 and the end of the stem 71, so that the supply of gas to the water heater burner starts before the pilot light is extinguished by closing of the restricted orifice. When the lever 60 moves in the opposite direction to close the valve 58 the reciprocable member 69 is permitted to move outwardly under the pressure of the spring 73. It will be noted that the orifice is opened before the valve 58 is completely closed, due to the clearance between the stem 71 and the portion 62. Accordingly, the pilot light overlaps the starting and stopping of supply of fuel gas to the water heater burner. Since the pin 69 is reciprocated each time the thermostatically actuated burner control valve functions, the orifice is kept free of clogging material.

Since the passages become most quickly clogged at the point of greatest restriction, my improved valve mechanism takes care of the cleansing of the mechanism so as to prevent stoppage and consequent failure of the flame supplied with gas through the valve mechanism. It is accordingly apparent that I have provided a mechanism which has the advantage that the user need not take the trouble to periodically clean out the valve mechanism since the valve mechanism is self-cleansing. I have furthermore provided, as one form of my invention, a mechanism which has the advantage that with changes in temperature, the flow of gas to a pilot flame or other discharge point is kept unobstructed, the cleaning of the restricted port or ports being automatic with the usual functioning of the apparatus.

While I have illustrated and described three specific forms of self-cleansing valve mechanisms, it will be understood that the invention is not restricted to the particular constructions shown, but may be variously embodied within the contemplation of the invention and under the scope of the following claims.

I claim:

1. In combination with a main burner having a pilot burner, a valve mechanism of the self-cleansing type, comprising a conduit for supplying fuel to the burner having two branches, one for carrying a flow of fuel to the main burner and the other for carrying fuel to the pilot burner, the latter branch having a restricted port intermediate its ends, cleaning means of a shape for extending into said restricted port, valve means adapted for opening the branch to the main burner while closing the branch to the pilot burner and for opening the branch to the pilot burner while closing the branch to the main burner and means comprising a temperature responsive device for actuating said valve means and for producing relative movement between the port and cleaning means upon actuation of said valve means.

2. In combination with a main burner having a pilot burner, a valve mechanism of the self-cleansing type, comprising a conduit for supplying fuel to the burner having two branches, one for carrying a flow of fuel to the main burner and the other for carrying fuel to the pilot burner, the latter branch having a restricted port intermediate its ends, an elongated cleaner of a cross-section for entering said restricted port, valve means adapted for opening the branch to the main burner while closing the branch to the pilot burner and for opening the branch to the pilot burner while closing the branch to the main burner and temperature responsive means for actuating said valve means and for reciprocating the cleaner into and from said port upon actuation of said valve means.

3. A valve mechanism of the self-cleansing type, comprising a conduit having a pair of opposed restricted ports in parallel, a pair of oppositely directed cleaning means of a shape for extending into said restricted ports, and a bi-metallic disc responsive to temperature changes for moving the cleaning means alternately into said ports.

4. In combination, thermostatically controlled valve mechanism for controlling the supply of fuel to a burner, a conduit for supplying fuel to a pilot burner, said conduit having a restricted port, and means actuated by the valve mechanism for cleaning the port.

5. In combination, a valve mechanism for controlling the supply of fuel to a burner, a conduit for supplying fuel to a pilot light for said burner, said conduit having a restricted port, and means actuated by said valve mechanism for cleansing said port, said valve mechanism having limited movement relative to said cleansing means.

6. In combination with a burner, a conduit for supplying fuel to said burner having two branches, one for carrying a relatively large flow of fuel thereto and the other for carrying a relatively restricted flow of fuel thereto, flow through the second branch being limited by a restricted port, and valve mechanism for controlling the supplying of fuel to said burner by the branches of said conduit, said valve mechanism comprising a projection for extending into and cleaning said restricted port upon operation of the mechanism for opening the first branch to permit flow of fuel to the burner therethrough.

7. In combination with a burner, a conduit for supplying fuel to said burner having two branches, one for carrying a relatively restricted flow of fuel to said burner and the other for carrying a relatively larger flow of fuel to said burner, means forming a restricted port for limiting flow through the first branch, and valve mechanism for controlling the supplying of fuel to said burner by the branches of said conduit, said valve mechanism comprising a valve proper and a projection carried thereby for cleansing said restricted port by entering the same upon opening of said valve.

8. In combination with a burner, a conduit for supplying fuel to said burner having two branches, one for carrying a relatively restricted flow of fuel to said burner and the other for carrying a relatively larger flow of fuel to said burner, means forming a restricted port for limiting flow through the first branch, and valve mechanism cooperating with both branches for controlling the supplying of fuel to said burner, said valve mechanism comprising a valve seat, a valve proper movable to and from said seat and a pin receivable in said restricted port when said valve proper is in open position, said valve seat and valve proper controlling flow through the second branch.

9. In combination with a burner, a conduit for supplying fuel to said burner having two branches, one for carrying a relatively large flow of fuel thereto and the other for carrying a restricted flow of fuel thereto, a member having a restricted port for limiting the flow through the second branch, and valve mechanism for controlling the supply of fuel to said burner by the branch for carrying the relatively large flow of fuel, and a projection member for extending into and cleaning said restricted port, one of said members being operable by the valve mechanism upon operation thereof for opening the first branch to permit flow of fuel to the burner to cause the projection to enter the restricted port and cleanse the same.

10. In combination with a burner, a valve mechanism of the self-cleansing type comprising a conduit for supplying fuel to the burner having two branches, each for carrying a flow of fuel thereto, a restricted port for one of the branches, valve means adapted for opening one branch while closing the other and also for closing the one branch while opening the other, cleansing means of a shape for extending into said restricted port, said restricted port and said cleansing means being mounted relative to each other and to the valve means for relative movement between the restricted port and the cleansing means to clean the restricted port upon actuation of said valve means.

11. In combination with a burner, a valve mechanism of the self-cleaning type comprising, a conduit for supplying fuel to the burner having two branches, each for carrying a flow of fuel thereto, at least one of the branches having a restricted port intermediate its ends, valve means comprising a temperature responsive device adapted for opening one branch while closing the other and also for closing the one branch while opening the other, cleaning means of a shape for extending into said restricted port, said restricted port and said cleaning means being mounted relative to each other and to the valve means for relative movement between the restricted port and the cleaning means to clean the restricted port upon temperature responsive actuation of said valve means.

WALTER L. SHIVELY.